United States Patent
Ishikawa

(10) Patent No.: US 10,447,194 B2
(45) Date of Patent: Oct. 15, 2019

(54) MOTOR DRIVE APPARATUS, BLOWER, MOTOR DRIVING METHOD, AND STORAGE MEDIUM

(71) Applicant: NIDEC SERVO CORPORATION, Kiryu-shi, Gunma (JP)

(72) Inventor: Masatomo Ishikawa, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 16/021,054

(22) Filed: Jun. 28, 2018

(65) Prior Publication Data

US 2019/0013764 A1    Jan. 10, 2019

(30) Foreign Application Priority Data

Jul. 7, 2017    (JP) .................. 2017-133528

(51) Int. Cl.
*H02P 29/024* (2016.01)
*H02P 3/08* (2006.01)

(52) U.S. Cl.
CPC ............ *H02P 29/0241* (2016.02); *H02P 3/08* (2013.01)

(58) Field of Classification Search
CPC ...... H02P 1/00; H02P 1/04; H02P 1/16; H02P 1/163; H02P 1/18; H02P 1/24; H02P 1/26; H02P 1/42; H02P 1/46; H02P 1/465; H02P 3/06; H02P 3/065; H02P 3/08; H02P 3/18; H02P 6/002; H02P 6/008; H02P 6/24; H02P 21/00; H02P 21/0035; H02P 23/00; H02P 27/00; H02P 27/04; H02P 27/06; H02P 23/04; H02P 27/02

USPC .... 318/400.01, 400.02, 400.14, 400.15, 700, 318/701, 727, 800, 801

See application file for complete search history.

(56) References Cited

U.S. PATENT DOCUMENTS 8,498,136 B2 * 7/2013 Shinomoto ......... H02M 1/4208
                                                              363/125
9,787,245 B2   10/2017 Yamamoto

FOREIGN PATENT DOCUMENTS

CN    204349431 U    5/2015
JP    2017-22909 A   1/2017

* cited by examiner

*Primary Examiner* — Anthony M Paul
(74) *Attorney, Agent, or Firm* — Keating & Bennett, LLP

(57) ABSTRACT

A motor drive apparatus for driving a motor includes a rectifier, a capacitor, an inverter circuit, a control portion arranged to output a drive signal, and a sensing portion arranged to sense a smoothed direct-current voltage, and output an analog sensing result to the control portion. After outputting a drive signal to drive the motor, the control portion quantizes the sensing result using a predetermined number of bits at a predetermined interval for a period longer than a power-supply period of an alternating-current power supply, determines $V_{n+1}$ which satisfies both $V_{n+1} > V_{n+2}$ and $V_{n+1} > V_n$ to be a peak value when $V_n$ denotes an nth voltage value obtained by quantizing the sensing result, determines whether the peak value is within a predetermined range, and outputs a drive signal to stop the motor if the peak value is outside of the predetermined range.

14 Claims, 6 Drawing Sheets

MOTOR DRIVE APPARATUS, BLOWER, MOTOR DRIVING METHOD, AND STORAGE MEDIUM

CROSS REFERENCE TO RELATED APPLICATIONS

This application claims the benefit of priority to Japanese Patent Application No. 2017-133528 filed on Jul. 7, 2017. The entire contents of this application are hereby incorporated herein by reference.

BACKGROUND OF THE INVENTION

1. Field of the Invention

The present disclosure relates to a motor drive apparatus, a blower, a motor driving method, and a storage medium.

2. Description of the Related Art

A known motor drive apparatus for driving a brushless DC motor rectifies and smoothes an alternating-current voltage supplied from an alternating-current power supply, monitors whether an abnormal voltage has occurred on the basis of an average value of the smoothed voltage, and stops the driving of the motor if an abnormal voltage is detected.

However, the amplitude of the smoothed voltage may vary with a motor load. In addition, a peak value of the smoothed voltage will be constant for the motor load. Therefore, in the case where the motor load is light and the amplitude is low, the average value of the smoothed voltage will be higher than in the case where the motor load is heavy, which may excessively limit the driving amount of the motor. In the case where the motor load is heavy and the amplitude is high, the average value of the smoothed voltage will be lower than in the case where the motor load is light, which may delay stopping the motor and lead to a malfunction of an element included in the motor drive apparatus.

SUMMARY OF THE INVENTION

A motor drive apparatus for driving a motor according to a preferred embodiment of the present disclosure includes a rectifier arranged to convert an alternating-current voltage supplied from an alternating-current power supply to a direct-current voltage; a capacitor arranged to smooth the direct-current voltage converted by the rectifier; an inverter circuit arranged to convert the direct-current voltage smoothed by the capacitor to an alternating-current voltage, and supply this alternating-current voltage to the motor; a control portion arranged to output a drive signal to drive the motor; and a sensing portion arranged to sense the smoothed direct-current voltage, and output an analog sensing result to the control portion. After outputting the drive signal to drive the motor, the control portion quantizes the sensing result using a predetermined number of bits at a predetermined interval for a period longer than a power-supply period of the alternating-current power supply, determines $V_{1+1}$ which satisfies both $V_{1+1} > V_{n+2}$ and $V_{1+1} > V_n$ to be a peak value when $V_n$ (where n is an integer equal to or greater than one) denotes an nth voltage value obtained by quantizing the sensing result, determines whether the peak value is within a predetermined range, and outputs a drive signal to stop the motor if the peak value is outside of the predetermined range.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, preferred embodiments of the present disclosure will be described with reference to the accompanying drawings. Note that the scope of the present disclosure is not limited to the preferred embodiments described below, but includes any modification thereof within the scope of the technical idea of the present disclosure.

Figure 1:
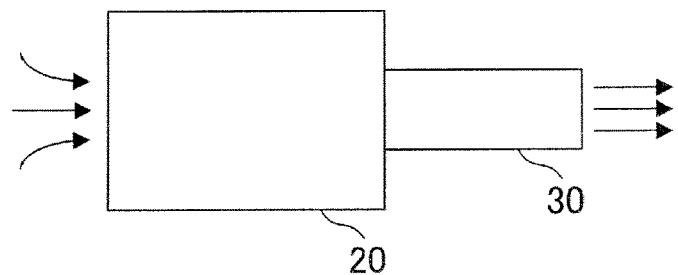
FIG. 1 is a schematic diagram of a blower according to a preferred embodiment of the present disclosure.

FIG. 1 is a schematic diagram of a blower 1 according to a preferred embodiment of the present disclosure. The blower 1 includes a fan system 20 and a duct 30. The blower 1 is used for ventilation, air conditioning, or the like. In the case where the blower 1 is used for ventilation in a room, for example, one end of the duct 30 is attached to the fan system 20, while another end of the duct 30 is arranged to open into an outside. The fan system 20 sends air in the room into the duct 30, and the air sent from the fan system 20 is discharged to the outside through the duct 30.

Figure 2:
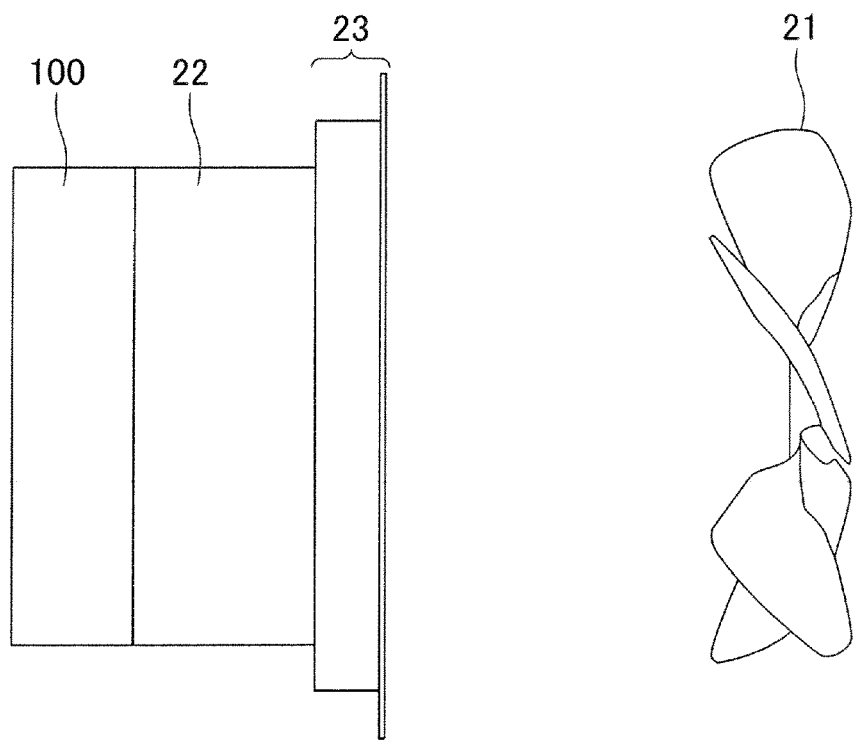
FIG. 2 is a schematic diagram illustrating the structure of a fan system according to a preferred embodiment of the present disclosure.

FIG. 2 is a schematic diagram illustrating the structure of the fan system 20. The fan system 20 includes a fan 21, a motor 22, a shroud 23, and a motor drive apparatus 100. The fan 21, the motor drive apparatus 100, and the motor 22 are fixed to the shroud 23. The fan 21 is caused to rotate by the motor 22, which is controlled by the motor drive apparatus 100. A three-phase synchronous brushless DC motor, which is driven by directly inputted alternating-current power, is used as the motor 22 in the present preferred embodiment, but a motor of another type may alternatively be used as the motor 22.

Figure 3:
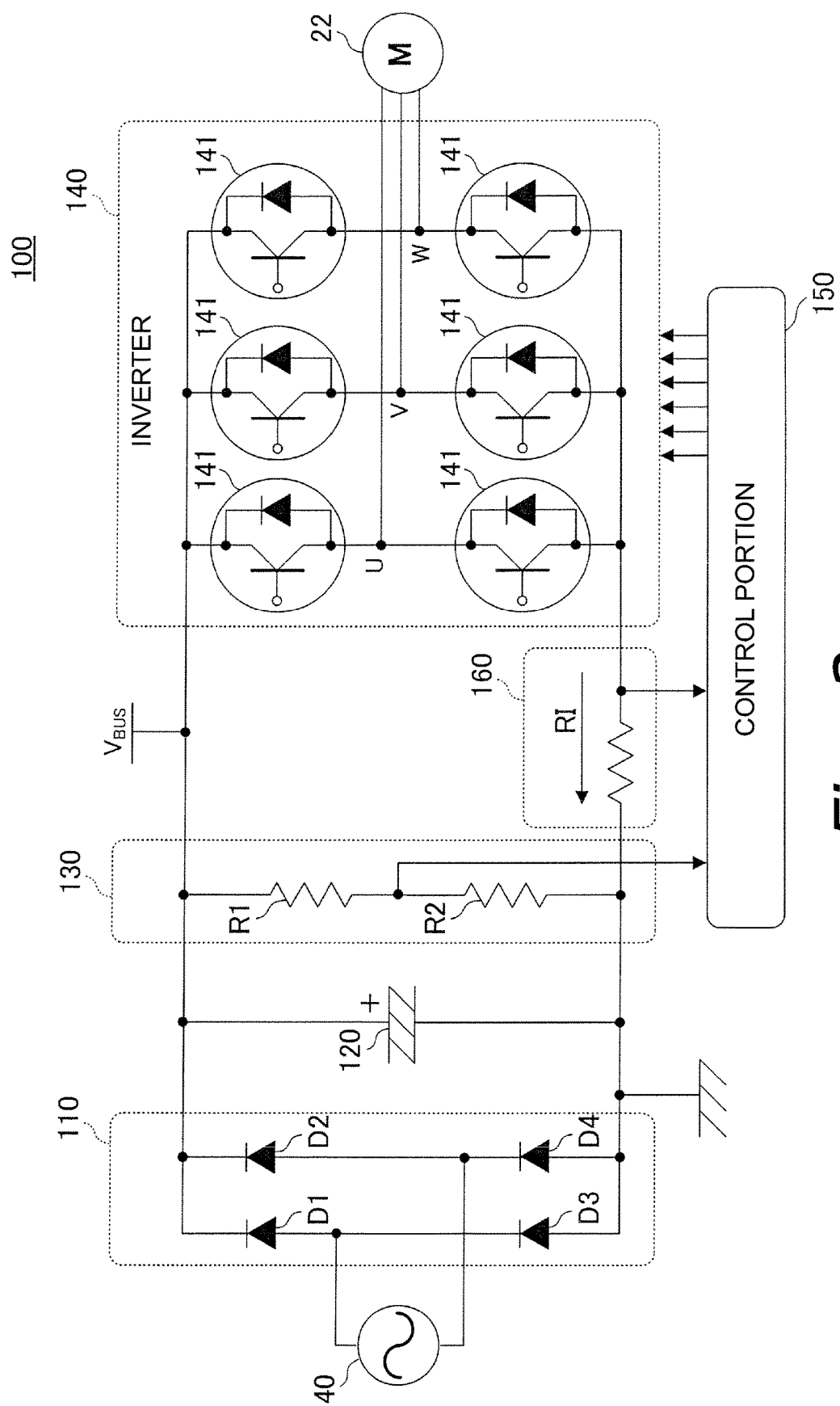
FIG. 3 is a block diagram illustrating the structure of a motor drive apparatus for driving a motor according to a preferred embodiment of the present disclosure.

FIG. 3 is a block diagram illustrating the structure of the motor drive apparatus 100, which is arranged to drive the motor 22. As illustrated in FIG. 3, the motor drive apparatus 100 includes a rectifier 110, a capacitor 120, a sensing portion 130, an inverter circuit 140, and a control portion 150.

The motor drive apparatus 100 is contained in a common casing together with the motor 22. An output shaft of, for example, a rotor of the motor 22 is arranged to protrude from the casing, and is attached to the fan 21. A reduced size of the fan system 20, for example, can be achieved by integrating the motor 22 and the motor drive apparatus 100 into, as it were, a single electromechanical piece.

The rectifier 110 is a full-wave rectifier circuit including diodes D1, D2, D3, and D4. The rectifier 110 is arranged to convert an alternating-current voltage supplied from an alternating-current power supply 40 to a direct-current voltage. The capacitor 120 is arranged to smooth the direct-current voltage converted by the rectifier 110.

The sensing portion 130 is arranged to sense $V_{BUS}$, which is the direct-current voltage smoothed by the capacitor 120, and output an analog sensing result to the control portion 150. The analog sensing result will be hereinafter referred to as an analog signal as appropriate. It is desirable that the sensing portion 130 is a voltage divider circuit including a resistor R1 and a resistor R2 as in the present preferred embodiment. The analog sensing result is a voltage value of $V_{BUS}$ obtained by voltage division by the voltage divider circuit.

The inverter circuit 140 is arranged to convert $V_{BUS}$ smoothed by the capacitor 120 to an alternating-current voltage, and supply the alternating-current voltage to the motor 22. The inverter circuit 140 includes pairs of switching elements 141 provided for respective phases of the motor 22, each pair including switching elements 141 connected in series. A transistor, such as a field-effect transistor, for example, is used as each switching element 141. In the present preferred embodiment, a metal-oxide-semiconductor field-effect transistor (MOSFET) is used as each switching element 141.

A middle connection point of a series circuit made up of each pair of switching elements 141 is connected to a winding of a separate one of U, V, and W phases of the motor 22. In addition, in the inverter circuit 140, a base (i.e., a gate) of each switching element 141 is switched on and off through a drive circuit (not shown). The inverter circuit 140 thus drives the motor 22 through output voltages of the switching elements 141. Note that each switching element 141 is provided with a protection diode.

Power to drive the motor 22 is obtained by switching operations of the switching elements 141 performed on the basis of drive signals outputted from the control portion 150. The drive signals outputted from the control portion 150 are, for example, PWM drive signals in accordance with a pulse width modulation system (i.e., a PWM system).

The control portion 150 is arranged to output the drive signals to drive the motor 22. The control portion 150 is, for example, a microcomputer (i.e., a micro). Direct-current power at a constant voltage, which is obtained by converting power from the alternating-current power supply 40 to direct-current power, is inputted to the control portion 150 through a power supply circuit (not shown).

The control portion 150 includes an analog-to-digital conversion circuit (hereinafter referred to as an A/D conversion portion). The A/D conversion portion quantizes $V_{BUS}$ in an analog form obtained by the voltage division in the sensing portion 130 using a predetermined number of bits, and the driving amount of the motor 22 is determined using resulting quantized data.

In addition, the motor drive apparatus 100 includes an electric current sensing circuit 160. The electric current sensing circuit 160 includes a resistor RI used for electric current sensing, and is provided on an earth line. The value of an electric current sensed by the electric current sensing circuit 160 is outputted to the control portion 150.

Figure 4:
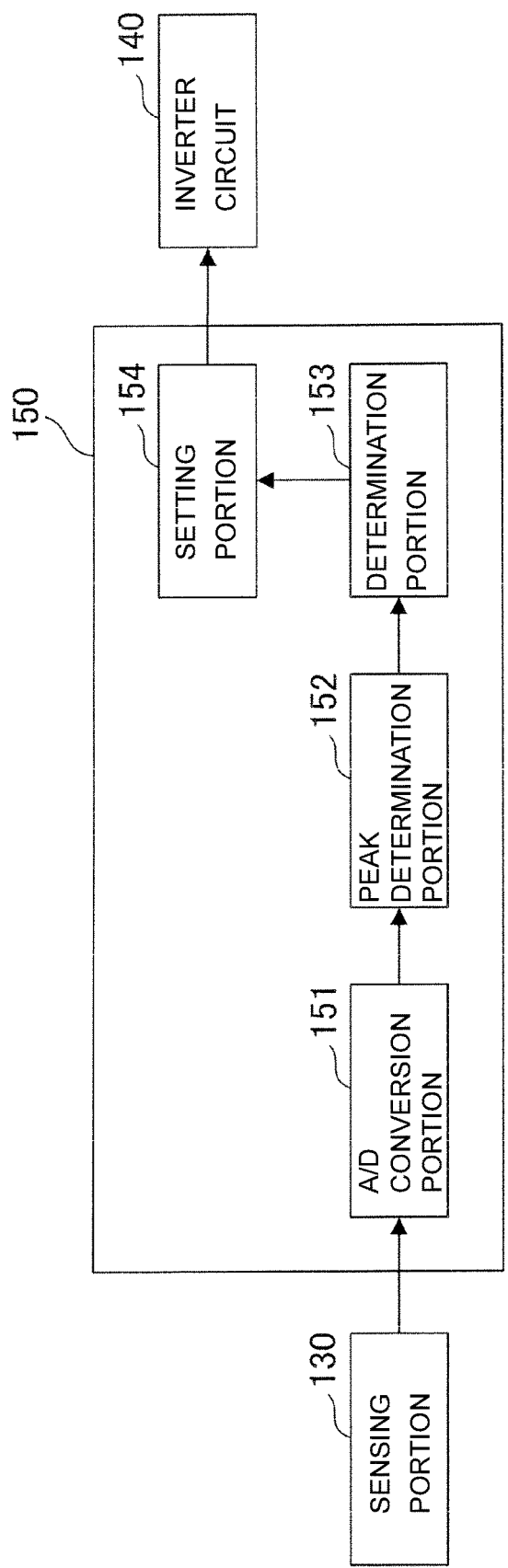
FIG. 4 is a block diagram illustrating various functions of a control portion according to a preferred embodiment of the present disclosure.

A method employed by the control portion 150 to control the motor 22 will now be described in detail below. FIG. 4 is a block diagram illustrating various functions of the control portion 150. The control portion 150 includes an A/D conversion portion 151, a peak determination portion 152, a determination portion 153, and a setting portion 154.

The A/D conversion portion 151 is arranged to quantize $V_{BUS}$ in the analog form outputted from the sensing portion 130 using the predetermined number of bits at a predetermined interval for a period longer than a power-supply period of the alternating-current power supply 40. In the case where the predetermined number of bits is arranged to be four, for example, $V_{BUS}$ in the analog form is quantized using 16 levels.

Figure 5:
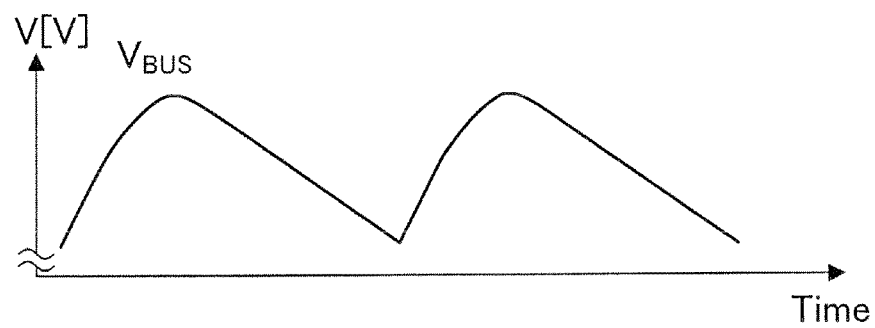
FIG. 5 illustrates a change over time of a voltage outputted from a sensing portion to the control portion according to a preferred embodiment of the present disclosure.

FIG. 5 illustrates a change over time of $V_{BUS}$ outputted from the sensing portion 130 to the control portion 150. A horizontal axis represents time, while a vertical axis represents voltage (V). The origin represents a point in time at which a drive signal to drive the motor 22 is outputted from the setting portion 154 to the inverter circuit 140. As illustrated in FIG. 5, $V_{BUS}$ varies over time in a curvilinear manner while forming peaks and valleys. An interval between the peaks is determined on the basis of the power-supply period of the alternating-current power supply 40. The interval between the peaks may not be constant depending on precision of a power-supply frequency. As described below, the motor drive apparatus 100 according to the present preferred embodiment detects peak voltages in succession during a predetermined period, and is therefore able to drive the motor 22 without being affected by the precision of the power-supply frequency.

Figure 6:
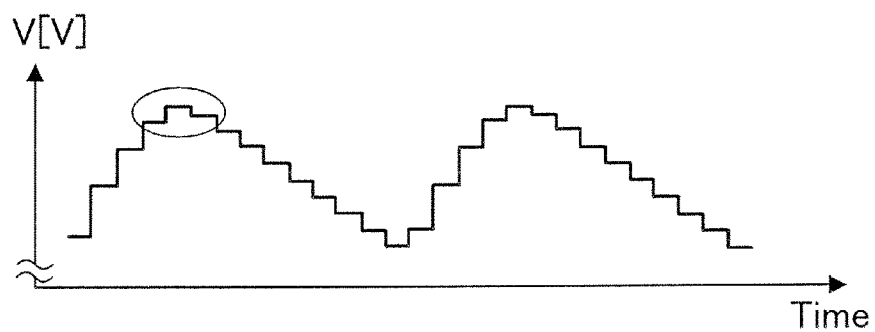
FIG. 6 illustrates a change over time of a voltage value quantized by an A/D conversion portion according to a preferred embodiment of the present disclosure.

FIG. 6 illustrates a change over time of the voltage values quantized by the A/D conversion portion 151. A horizontal axis represents time, while a vertical axis represents voltage (V). Referring to FIG. 6, a curved line representing $V_{BUS}$ as illustrated in FIG. 5 is expressed by a stepped line graph as illustrated in FIG. 6.

The power-supply period of the alternating-current power supply 40 is about 8 msec in the case where the power-supply frequency is 120 Hz, for example. In the case where the power-supply period is about 8 msec, the predetermined interval is (see FIG. 7) at which the A/D conversion portion 151 quantizes $V_{BUS}$ is arranged to be shorter than 8 msec, and is arranged to be, for example, 1 msec. Accuracy in the detection of the peak voltages can be improved by arranging the predetermined interval to be shorter than the power-supply period.

Figure 7:
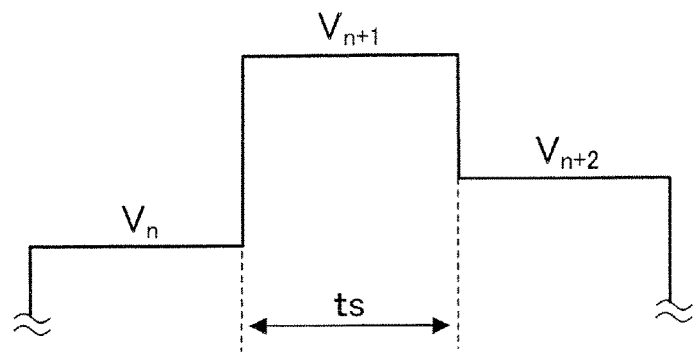
FIG. 7 is a diagram illustrating a portion of FIG. 6 which is enclosed by a circle in an enlarged form.

FIG. 7 is a diagram illustrating a portion of FIG. 6 which is enclosed by a circle in an enlarged form. Referring to FIG. 7, on the assumption that $V_n$ (where n is an integer equal to or greater than one) denotes an nth voltage value quantized by the A/D conversion portion 151, the peak determination portion 152 determines $V_{n+1}$ which satisfies both $V_{n+1} > V_{n+2}$ and $V_{n+1} > V_n$ to be a peak value.

The determination portion 153 determines whether the peak value determined by the peak determination portion 152 is within a predetermined range. A result of this determination is outputted to the setting portion 154. The predetermined range is a range of voltage values that can be detected by the sensing portion 130 during motor operation while there is no short circuit occurring in the motor drive apparatus 100 or while the alternating-current power supply 40 is in normal operation. This range will be hereinafter referred to as a normal range. When ranges of voltage values that can be detected when there is a short circuit occurring in the motor drive apparatus 100 or when an abnormality has occurred in the alternating-current power supply 40 are referred to as abnormal ranges, so-called hysteresis is provided between a lower limit of the normal range and a lower abnormal range and between an upper limit of the normal range and an upper abnormal range. Provision of the hysteresis contributes to preventing a hunting from occurring due to the peak voltage fluctuating near a boundary of the normal range. The hysteresis may be, for example, 5 V.

Figure 8:
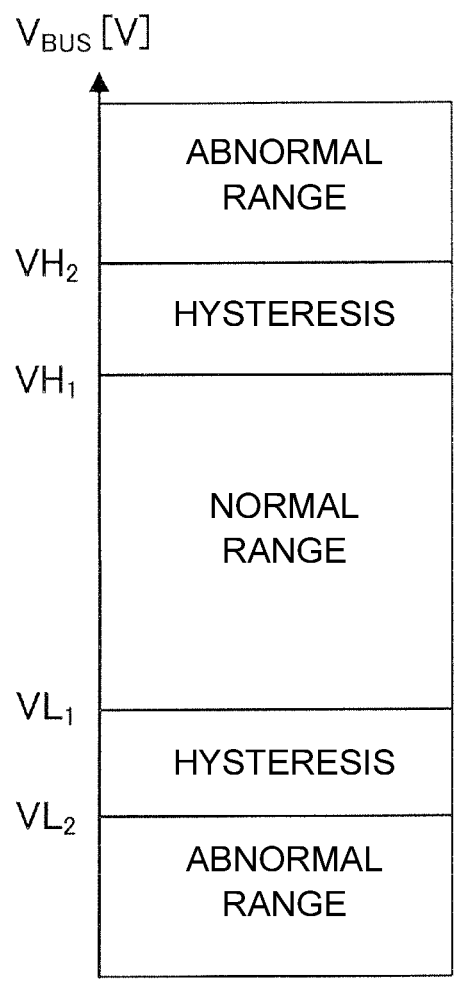
FIG. 8 is a diagram illustrating a relationship between a normal range, abnormal ranges, and hysteresis according to a preferred embodiment of the present disclosure.

FIG. 8 is a diagram illustrating a relationship between the normal range, the abnormal ranges, and the hysteresis. It is assumed that $V_{L1}$ and $V_{L2}$ denote, respectively, a voltage at the lower limit of the normal range and a voltage obtained by subtracting the hysteresis from $V_{L1}$. It is also assumed that $V_{H1}$ and $V_{H2}$ denote, respectively, a voltage at the upper limit of the normal range and a voltage obtained by adding the hysteresis to $V_{H1}$.

When $V_{n+1} > V_{H2}$ or $V_{n+1} < V_{L2}$, the setting portion 154 sets a drive signal to stop the motor 22, and outputs the drive signal to the inverter circuit 140.

As described above, the motor drive apparatus 100 according to the present preferred embodiment is able to determine the driving amount of the motor 22 using the peak voltage as a reference value. This reduces the likelihood that the motor drive apparatus 100 will be affected by a change in the direct-current voltage, and contributes to preventing a malfunction of an element included in the motor drive apparatus 100.

When $V_{L1} \leq V_{n+1} \leq V_{H1}$, the setting portion 154 sets the drive signal to drive the motor 22, and outputs the drive signal to the inverter circuit 140. In addition, if $V_{n+1}$ satisfies the inequality $V_{L1} \leq V_{n+1} \leq V_{H1}$ after the setting portion 154 outputs the drive signal to stop the motor 22 to the inverter circuit 140, the setting portion 154 sets the drive signal to drive the motor 22, and outputs the drive signal to the inverter circuit 140. Note that a condition other than $V_{L1} \leq V_{n+1} \leq V_{H1}$, e.g., an internal temperature of the motor drive apparatus 100 or the like, may be set as a condition for re-driving the motor 22. As described above, the motor drive apparatus 100 according to the present preferred embodiment is able to automatically re-drive the motor once stopped when the reference value has entered into the predetermined range.

After outputting the drive signal to drive the motor 22, the peak determination portion 152 holds a plurality of peak voltages obtained during a period longer than the power-supply period of the alternating-current power supply 40, and determines a reference value to be used by the determination portion 153 on the basis of the plurality of peak voltages. Determining the reference value to be used by the determination portion 153 taking a change in the peak voltages into account contributes to preventing a malfunction of an element included in the motor drive apparatus 100.

The peak determination portion 152 may determine the greatest one of the plurality of peak voltages to be the reference value. Determining the driving amount of the motor 22 using the greatest one of the plurality of peak voltages as the reference value contributes to preventing a malfunction of an element included in the motor drive apparatus 100 even when the peak voltage changes.

The peak determination portion 152 may determine an average of the plurality of peak values to be the reference value. Determining the driving amount of the motor 22 using the average of the plurality of peak voltages as the reference value contributes to preventing a malfunction of an element included in the motor drive apparatus 100 even when the peak voltage changes.

The peak determination portion 152 may determine the reference value every time each of the plurality of peak voltages is determined. Updating the reference value every time the peak voltage is determined also contributes to preventing a malfunction of an element included in the motor drive apparatus 100 even when the peak voltage changes.

The peak determination portion 152 may determine the reference value at an interval of the power-supply period of the alternating-current power supply 40. Updating the reference value at or near a time when a new peak voltage is determined at the interval of the power-supply period contributes to preventing a malfunction of an element included in the motor drive apparatus 100 even when the peak voltage changes.

Note that, although the motor drive apparatus 100 described above controls the motor 22 on the basis of the peak voltage, the motor drive apparatus 100 may alternatively be arranged to control the motor 22 using a voltage value at a valley as illustrated in FIG. 5, that is, a bottom voltage.

A bottom value is determined by the peak determination portion 152. The peak determination portion 152 determines $V_{n+1}$ which satisfies both $V_{n+1} < V_{n+2}$ and $V_{n+1} < V_n$ to be a bottom value. The determination portion 153 determines whether the bottom value determined by the peak determination portion 152 is within the normal range. A result of this determination is outputted to the setting portion 154. When $V_{n+1} > V_{H2}$ or $V_{n+1} < V_{L2}$, the setting portion 154 sets the drive signal to stop the motor 22, and outputs the drive signal to the inverter circuit 140.

Determining the driving amount of the motor 22 using the bottom value as the reference value reduces the likelihood that the motor drive apparatus 100 will be affected by a change in the direct-current voltage, and contributes to preventing the driving amount of the motor 22 from being excessively limited.

The blower 1 including the fan 21 is able to operate with stability when the motor 22 to drive the fan 21 is controlled by the motor drive apparatus 100 according to the above-described preferred embodiment.

Figure 9:
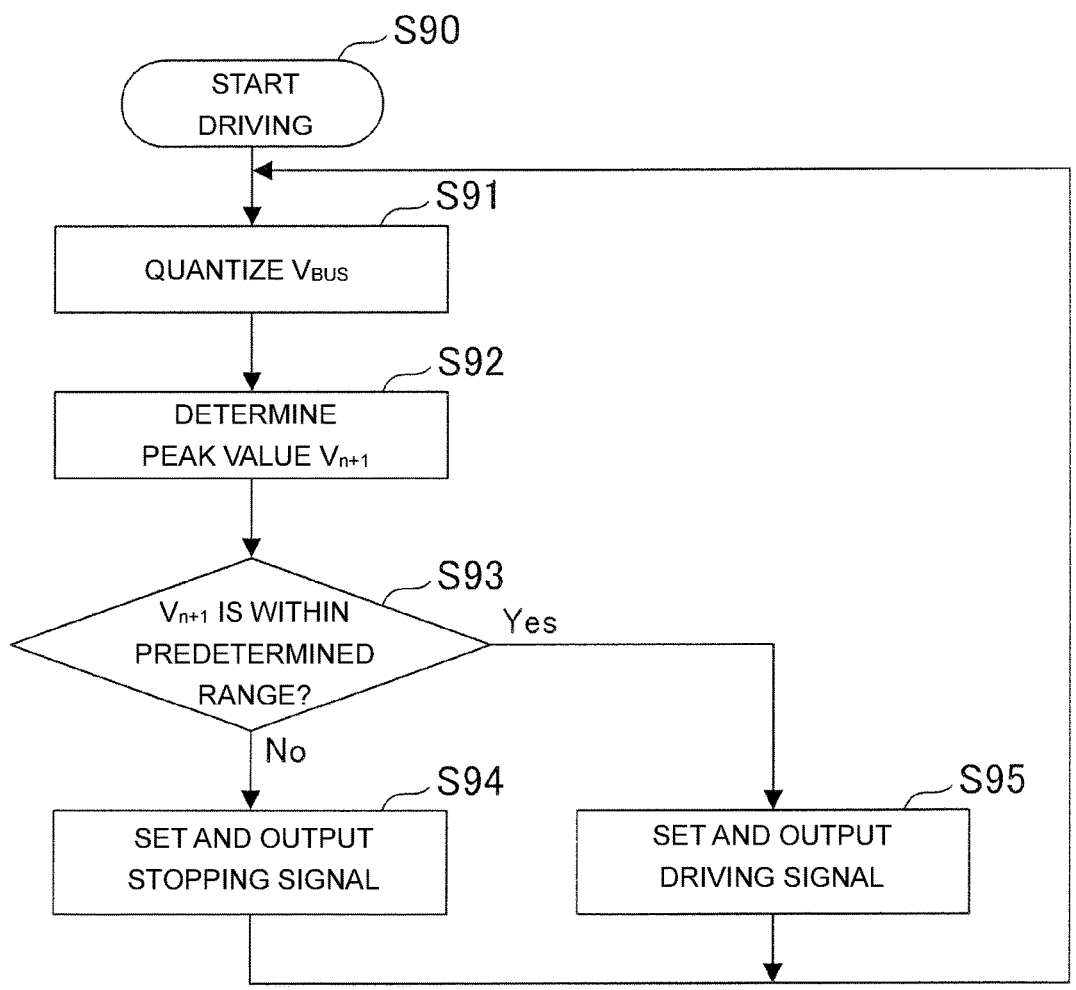
FIG. 9 is a flowchart illustrating a procedure performed by the motor drive apparatus to determine a driving amount according to a preferred embodiment of the present disclosure.

FIG. 9 is a flowchart illustrating a procedure performed by the motor drive apparatus 100 to determine the driving amount. At step S90, the setting portion 154 sets the driving amount of the motor 22, and outputs the driving amount to the inverter circuit 140, whereby the motor 22 starts operating. At step S91, the A/D conversion portion 151 quantizes $V_{BUS}$ in the analog form outputted from the sensing portion 130 using the predetermined number of bits at the predetermined interval for a period longer than the power-supply period of the alternating-current power supply 40.

At step S92, on the assumption that $V_n$ denotes the nth voltage value quantized by the A/D conversion portion 151, the peak determination portion 152 determines $V_{n+1}$ which satisfies both $V_{n+1} > V_{n+2}$ and $V_{n+1} > V_n$ as illustrated in FIG. 7 to be the peak value.

At step S93, the determination portion 153 determines whether the peak value determined by the peak determination portion 152 is within the predetermined range. If it is determined at step S93 that the peak value is outside of the predetermined range, i.e., if $V_{n+1} > V_{H2}$ or $V_{n+1} < V_{n+2}$, the setting portion 154 sets the drive signal to stop the motor 22, and outputs the drive signal to the inverter circuit 140 at step S94.

After step S94, control returns to step S91, and monitoring of the peak voltage continues. If it is determined at a subsequent iteration of step S93 that the peak value is within the predetermined range, the motor 22 is re-driven at step S95.

If it is determined at step S93 that the peak value is within the predetermined range, i.e., if $V_{L1} \leq V_{n+1} \leq V_{H1}$, the setting portion 154 sets the drive signal to drive the motor 22, and outputs the drive signal to the inverter circuit 140 at step S95. After step S95, control returns to step S91, and the monitoring of the peak voltage continues.

According to the above-described control flow, the driving amount of the motor 22 can be determined using the peak voltage as the reference value, and this reduces the likelihood that the motor drive apparatus 100 will be affected by a change in the direct-current voltage, and contributes to preventing the driving amount of the motor 22 from being excessively limited, or preventing a malfunction of an element included in the motor drive apparatus 100.

Note that a program for causing a computer to perform the above-described driving method may be stored in a computer-readable storage medium, such as, for example, a semiconductor memory, a magnetic disk, or an optical disk, and this storage medium may be accessed by the computer to execute the above program.

Preferred embodiments of the present disclosure provide a blower, a motor driving method, a storage medium, and a motor drive apparatus with increased safety and a reduced likelihood of being affected by a change in voltage.

While preferred embodiments of the present disclosure have been described above, it will be understood that the present disclosure is not limited to the above-described preferred embodiments, and that the above-described preferred embodiments may be modified or changed in various manners without departing from the scope and spirit of the present disclosure.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor drive apparatus for driving a motor, the motor drive apparatus comprising:
  a rectifier arranged to convert an alternating-current voltage supplied from an alternating-current power supply to a direct-current voltage;
  a capacitor arranged to smooth the direct-current voltage converted by the rectifier;
  an inverter circuit arranged to convert the direct-current voltage smoothed by the capacitor to an alternating-current voltage, and supply this alternating-current voltage to the motor;
  a control portion arranged to output a drive signal to drive the motor; and
  a sensing portion arranged to sense the smoothed direct-current voltage, and output an analog sensing result to the control portion; wherein after outputting the drive signal to drive the motor, the control portion quantizes the sensing result using a predetermined number of bits at a predetermined interval for a period longer than a power-supply period of the alternating-current power supply, determines $V_{n+1}$ which satisfies both $V_{n+1} > V_{n+2}$ and $V_{n+1} > V_n$ to be a peak value when $V_n$ (where n is an integer equal to or greater than one) denotes an nth voltage value obtained by quantizing the sensing result, determines whether the peak value is within a predetermined range, and outputs a drive signal to stop the motor if the peak value is outside of the predetermined range.

2. The motor drive apparatus according to claim 1, wherein the control portion outputs the drive signal to drive the motor if the control portion determines that the peak value is within the predetermined range after outputting the drive signal to stop the motor.

3. The motor drive apparatus according to claim 1, wherein the predetermined interval is shorter than the power-supply period.

4. The motor drive apparatus according to claim 1, wherein the control portion holds a plurality of peak values obtained during the period longer than the power-supply period, determines a reference value on a basis of the plurality of peak values, determines whether the reference value is within the predetermined range, and outputs the drive signal to stop the motor if the reference value is outside of the predetermined range.

5. The motor drive apparatus according to claim 4, wherein the control portion determines a greatest one of the plurality of peak values to be the reference value.

6. The motor drive apparatus according to claim 5, wherein the control portion determines the reference value every time the peak value is determined.

7. The motor drive apparatus according to claim 5, wherein the control portion determines the reference value at an interval of the power-supply period.

8. The motor drive apparatus according to claim 4, wherein the control portion determines an average of the plurality of peak values to be the reference value.

9. The motor drive apparatus according to claim 8, wherein the control portion determines the reference value every time the peak value is determined.

10. The motor drive apparatus according to claim 8, wherein the control portion determines the reference value at an interval of the power-supply period.

11. The motor drive apparatus according to claim 1, wherein, after outputting the drive signal to drive the motor, the control portion determines $V_{n+1}$ which satisfies both $V_{n+1} < V_{n+2}$ and $V_{n+1} < V_n$ to be a bottom value, determines whether the bottom value is within the predetermined range, and outputs the drive signal to stop the motor if the bottom value is outside of the predetermined range.

12. A blower comprising a fan driven by a motor controlled by the motor drive apparatus of claim 1.

13. A motor driving method which drives a motor using a direct-current voltage obtained by converting an alternating-current voltage supplied from an alternating-current power supply to a direct-current voltage, and smoothing the converted direct-current voltage, the motor driving method comprising the steps of:
  a) driving the motor;
  b) after the driving, quantizing an analog signal representing the smoothed voltage using a predetermined number of bits at a predetermined interval for a period longer than a power-supply period of the alternating-current power supply;
  c) determining $V_{n+1}$ which satisfies both $V_{n+1} > V_{n+2}$ and $V_{n+1} > V_n$ to be a peak value when $V_n$ (where n is an integer equal to or greater than one) denotes an nth voltage value obtained by quantizing the analog signal;

d) determining whether the peak value is within a predetermined range; and e) stopping the motor if the peak value is outside of the predetermined range.

14. A non-transitory computer-readable storage medium having stored therein a program for causing a computer to perform a motor driving method which drives a motor using a direct-current voltage obtained by converting an alternating-current voltage supplied from an alternating-current power supply to a direct-current voltage, and smoothing the converted direct-current voltage, the motor driving method comprising the steps of:

a) driving the motor;

b) after the driving, quantizing an analog signal representing the smoothed voltage using a predetermined number of bits at a predetermined interval for a period longer than a power-supply period of the alternating-current power supply;

c) determining $V_{n+1}$ which satisfies both $V_{n+1} > V_{n+2}$ and $V_{n+1} > V_n$ to be a peak value when $V_n$ (where n is an integer equal to or greater than one) denotes an nth voltage value obtained by quantizing the analog signal;

d) determining whether the peak value is within a predetermined range; and e) stopping the motor if it is determined in step d) that the peak value is outside of the predetermined range.

* * * * *